(12) United States Patent
Lokamathe et al.

(10) Patent No.: US 11,245,709 B2
(45) Date of Patent: Feb. 8, 2022

(54) MULTI-VERIFIER APPROACH FOR ATTESTATION OF NODES IN A NETWORK

(71) Applicant: Tata Consultancy Services Limited, Mumbai (IN)

(72) Inventors: Shivraj Vijayshankar Lokamathe, Bengaluru (IN); Meena Singh Dilip Thakur, Bengaluru (IN); Rajan Mindigal Alasingara Bhattachar, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 315 days.

(21) Appl. No.: 16/153,109

(22) Filed: Oct. 5, 2018

(65) Prior Publication Data
US 2019/0109866 A1    Apr. 11, 2019

(30) Foreign Application Priority Data

Oct. 5, 2017   (IN) .............................. 201721035352

(51) Int. Cl.
| | | |
|---|---|---|
| *G08B 23/00* | (2006.01) | |
| *G06F 12/16* | (2006.01) | |
| *G06F 12/14* | (2006.01) | |
| *G06F 11/00* | (2006.01) | |
| *H04L 29/06* | (2006.01) | |
| *H04W 12/122* | (2021.01) | |

(52) U.S. Cl.
CPC ........ *H04L 63/1416* (2013.01); *H04L 63/126* (2013.01); *H04L 63/1425* (2013.01); *H04W 12/122* (2021.01); *H04L 2209/38* (2013.01)

(58) Field of Classification Search
CPC .............. H04L 63/1416; H04L 63/126; H04L 63/1425; H04W 12/1202
USPC ............................................................ 726/23
See application file for complete search history.

(56) References Cited

U.S. PATENT DOCUMENTS

| | | | |
|---|---|---|---|
| 9,276,905 B2 | 3/2016 | Coker, II et al. | |
| 2016/0366180 A1* | 12/2016 | Smith | ..................... H04L 63/20 |
| 2017/0090483 A1* | 3/2017 | Smith | ................... B64C 39/024 |

(Continued)

OTHER PUBLICATIONS

Arvind Seshadri; SCUBA: Secure Code Update By Attestation in Sensor Networks. ACM:2006; pp. 85-94.*

*Primary Examiner* — Monjur Rahim
(74) *Attorney, Agent, or Firm* — Finnegan, Henderson, Farabow, Garrett & Dunner, LLP (57) ABSTRACT

This disclosure relates generally to contract management, and more particularly to contract management in a data marketplace. In an embodiment, a system for contract management performs refactoring of a contract, during which the system extracts terms and conditions from the contract and generates a simplified view of the contract. The system further performs a requirement validation based on the contract, during which the system determines features of data entity matches requirements specified by a first party or not, based on domain specific ontologies. If the data entity features are not matching with the requirements, then the system fetches one or more relevant attributes from a list of ontologies, verifies whether the features of entity along with the selected feature(s) satisfy the requirements or not. The system accordingly generates an agreeable requirement document as output of the requirement validation.

16 Claims, 7 Drawing Sheets

(56) References Cited

U.S. PATENT DOCUMENTS

2017/0126647 A1* 5/2017 Zhang ................ H04L 63/08
2018/0103021 A1* 4/2018 Arunkumar .......... H04L 63/108
2018/0331821 A1* 11/2018 Gray .................. H04L 9/0897

* cited by examiner

MULTI-VERIFIER APPROACH FOR ATTESTATION OF NODES IN A NETWORK

PRIORITY CLAIM

This U.S. patent application claims priority under 35 U.S.C. § 119 to: India Application No. 201721035352, filed on 2017 Oct. 5. The entire contents of the aforementioned application are incorporated herein by reference.

TECHNICAL FIELD

This disclosure relates generally to device attestation, and more particularly to a multi-verifier approach for attestation of nodes in a network.

BACKGROUND

Attestation, in a trusted computing environment, refers to a mechanism for verifying integrity of a software or a device, or OEM specification, so as to prove that the software/device is trustworthy. As successful attestation indicates that the software and/or device that got attested is working as expected and is reliable, such software and/or device can then be deployed to serve intended purposes, which may even include handling secured data.

At present, techniques such as but not limited to certificate based device attestation and zero knowledge protocol based attestation are being used for the attestation purpose. In the certificate based device attestation technique, a device (Prover) entity generates public private key pair and requests the Authorized Entity (Attester) to certify keys and other attribute hashes. Further, a third party/external device requests the prover device to prove its attribute (ID, Software, code and so on). The Prover device provides the details as signed by the Attester in certificate format to the verifier. The verifier device validates the signature and compares hash of one or more attributes stored local for correctness, wherein the number of attributes and type of attributes being used can vary according to implementation standards and requirements. Thus the attestation and verification process is carried out. In the zero knowledge protocol based attestation technique, an honest prover can prove own integrity to a verifier in such a way that the prover can convince the verifier by committing on set of initial values. The verifier throws up a random challenge to the verifier. Now the prover proves the challenge in terms of the initially committed values. This can be verified by the verifier using the initial committed values.

The inventors here have recognized several technical problems with such conventional systems, as explained below. The existing systems rely on a single verifier approach. In the single verifier approach, as only a single verifier is present, any failure of the verifier can affect the whole attestation process. Similarly, there are chances that the verifier is hacked and is rogue. In that case also, the malicious verifier can adversely affect the verification process, by performing incorrect attestation, and in turn can affect working of the whole network.

SUMMARY

Embodiments of the present disclosure present technological improvements as solutions to one or more of the above-mentioned technical problems recognized by the inventors in conventional systems. For example, in one embodiment, a processor-implemented method is provided. In this method, initially, a plurality of nodes among a plurality of connected nodes in a network are identified as verifier nodes, via one or more hardware processors, by the network. Further, each of said plurality of verifier nodes individually collects data required for performing attestation of every other node in the network, via the one or more hardware processors, wherein the every other node comprises of verifier nodes and non-verifier nodes. Further, attestation of all nodes of the network is performed based on the data collected by all the verifier nodes.

In another embodiment, a network is provided. Each of a plurality of nodes in the network includes a processor; and a memory module comprising a plurality of instructions. The plurality of instructions are configured to cause the processor to identify a plurality of nodes among a plurality of connected nodes in a network, as verifier nodes, via one or more hardware processors, by the network. Further, each of said plurality of verifier nodes individually collects data required for performing attestation of every other node in the network, via the one or more hardware processors, wherein the every other node comprises of verifier nodes and non-verifier nodes. Further, attestation of all nodes of the network is performed based on the data collected by all the verifier nodes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
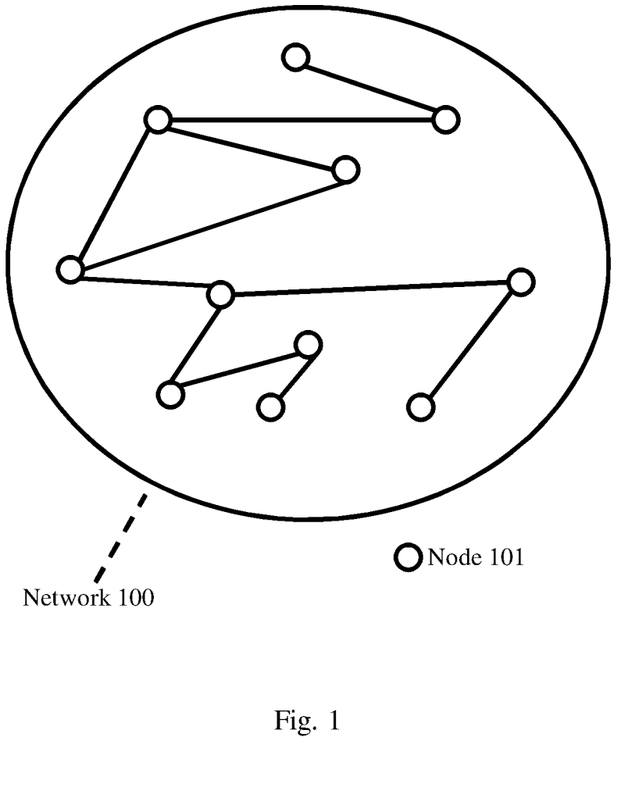
FIG. 1 is an exemplary block diagram of a network comprising multiple connected nodes in which attestation can be performed, according to some embodiments of the present disclosure.

FIG. 1 is an exemplary block diagram of a network comprising multiple connected nodes in which attestation can be performed, according to some embodiments of the present disclosure. As depicted in this figure, every node in the network is connected with every other node in the network, either directly or indirectly. Here, direct connection refers to a condition when the verifier node/device can directly reach node/device under attestation process as to one-to-one topology, and indirect connection refers to a condition when the verifier node/device can indirectly reach node/device under attestation process by hoping intermediate/delegating node/device.

In the multi-verifier approach, a few nodes among all nodes of the network are selected as verifier nodes. In an embodiment, the selection of verifier nodes may be based on a suitable algorithm. In another embodiment, a few of the nodes are selected as the verifier nodes, during the network configuration, by an authorized person. Minimum number of verifier nodes for attestation, in a network may be determined as:

$$\text{Minimum number of verifier nodes} = \left[\frac{n}{2} + 1\right]$$

where 'n' is total number of nodes in the network.

Figure 3:
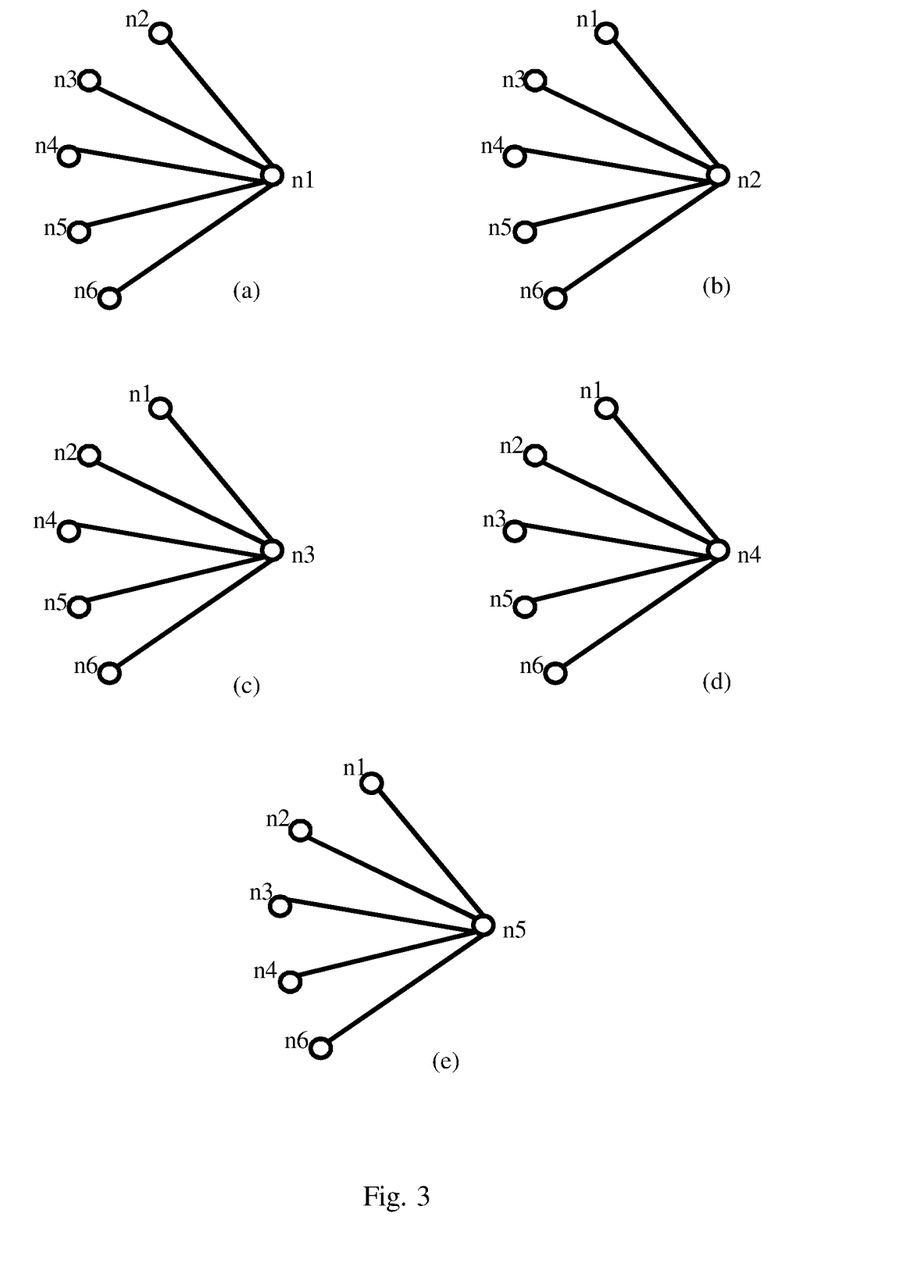
FIG. 3 is a block diagram representing multi-verifier mechanism in a network of swarm of connected nodes, according to some embodiments of the present disclosure.

The verifier nodes are capable of performing attestation of every other node in the network 100, independently of every other verifier node in the network, further wherein 'every other node' herein refers to all non-verifier nodes and the other verifier nodes of the network. For example, assume nodes 'n1', n2, and 'n3' are verifier nodes, and nodes 'n4', and 'n5' are non-verifier nodes. In such a network, when node n1 performs attestation of n2, n3, n4, and n5. Similarly, n2 verifies n1, n3, n4, and n5. Here one verifier node can perform attestation of another verification node. In an embodiment, the verifier nodes can use any suitable attestation mechanism (for example, certification based, or zero knowledge based attestation) as required to perform the attestation of the nodes. This mechanism of separately performing the attestation of nodes is depicted in FIG. 3. Further, the verifier nodes may be configured to initiate the attestation, in response to an instruction/request received from a prover node of the network, which is to be attested. Further, in a preliminary stage of the attestation, each verifier node collects data required to perform attestation of every other node of the network, from appropriate nodes. In an embodiment, the data collected herein refers to 'attestation data' pertaining to each node. The attestation data for a node is generated while the node joins a swarm of nodes (a registration process), and is a one-time activity. Steps executed (in sequence) by the node while joining a swarm is given below:
Generate own public and private keys by the node (If the node already has keys, this step is skipped)
Get its public key signed by the Certification Authority (digital certificate)
Generate hash codes of one or more applications in the node, whose attestation is to be performed, by the node.

Data thus generated is distributed among all nodes of the network (or swarm the node is part of) which in turn is stored in an associated database.

Given below is representative values of a deployment scenario, and corresponding public and private key values:
SWARM ID: SWARM ID_1
NODE ID: NODE ID_1
APPLICATION ID: APPLICATION_ID_1
KEY_GENERATION_ALGORITHM: DSA
KeySize: 1024
NODE_ID_1_PUBLIC_KEY: Sun DSA Public Key
Parameters: Digital Signature Algorithm (DSA)
   p:fd7f5381 1d751229 52df4a9c 2eece4e7 f611b752 3cef4400 c31e3f80 b651266 9455d4022 51fb593d 8d58fabf c5f5ba30 f6cb9b55 6cd7813b 801d346f f26660b7 6b9950a5 a49f9fe8 047b1022 c24fbba9 d7feb7c6 1bf83b57 e7c6a8a6 150f04fb 83f6d3c5 1ec30235 54135a16 9132f675 f3ae2b61 d72aeff2 2203199d d14801c7
   q:9760508f 15230bcc b292b982 a2eb840b f0581cf5 g: f7e1a085 d69b3dde cbbcab5c 36b857b9 7994afbb fa3aea82 f9574c0b 3d078267 5159578e bad4594f e6710710 8180b449 167123e8 4c281613 b7cf0932 8cc8a6e1 3c167a8b 547c8d28 e0a3ae1e 2bb3a675 916ea37f 0bfa2135 62f1fb62 7a01243b cca4f1be a8519089 a883dfe1 5ae59f06 928b665e 807b5525 64014c3b fecf492a
   y:a5a47acd ffd49264 3e967592 90417f0b 503b72ca ffad69a5 26f9b19e 58da42e3 52bf3b86 cb2420cf 94c28849 353bdda5 9b52bce9 9f510b43 0d5dc22d e2913afd 00d26b15 106f813f ebc78ef1 6f93bb1b ce37e0dc ca2b71ce 13308955 30f4c3f3 7025e692 8fd1d2ac f5583784 3968bcdc 463037d5 fad320d8 a5fa3a35 11051c70
NODE_ID_1_PRIVATE_KEY:
   MIIBSwIBADCCASwGByqGSM44BAEwggEfAo GBAP1/U4EddRIpUt9KnC7s5Of 2EbdSPO9EAMMeP4C2USZpRV1AllH7WT2N WPq/xfW6MPbLm1Vs14E7gB00 b/JmYL-drmVCIpJ+f6AR7ECLCT7up1/ 63xhv4O1fnxqimFQ8E+4P208Ueww11VB NaFpEy9nXzrith1yrv8iIDGZ3RSAHHAhUAI2BQ jxUjC8yykrmCouuEC/BYHPUCg YEA9+ GghdabPd7LvKtcNrhXuXmUr7v6OuqC+ VdMCz0HgmdRWVeOutRZT+Z xBxCBgLRJFnEj6EwoFhO3zwkyjMim4TwWeotU fl0o4KOuHiuzpnWRbqN/C/oh NWLx+ 2J6ASQ7zKTxvqhRklmog9/ hWuWfBpKLZI6Ae1UIZAFMO/7PSSoEFgIU KxpzYxoCtdEWEVWCB1Kym2KIUhY=
APPLICATION_ID_1_HASH:
7feS40IpklarnhB7/Jvfov3eUIHCfnBoFurzDRfb/Uo=
SELF SIGNED SIGNATURE:
   MCwCFC975AXAZXKa/ 3pMRxoV2ZAn1VACAhRBOdb/ CMhIRi3YYvp61EjvWF2yNg==

In various embodiments, each verifier node can communicate with (using a suitable protocol such as but not limited to Message Queue Telemetry Transport (MQTT), and Remote Procedure Call (RPC)), and collect data from, directly connected as well as indirectly connected nodes of the network. Further, the type of data collected can vary based on type of request response. For example, when a node initiates a verification request for attesting an application in the node, corresponding node verification request would comprise of:
SWARM ID
NODE ID
APPLICATION ID Similarly an attestation verification request comprises of:
SWARM ID
NODE ID
APPLICATION ID
PUBLIC KEY
ATTESTATION PUBLIC KEY
APPLICATION HASH
NODE SIGNATURE A response (Attestation Verification Response) to the attestation verification request comprises of:
SWARM ID
NODE ID
APPLICATION ID
PUBLIC KEY
ATTESTATION PUBLIC KEY
RESULT
RESULT HASH
NODE SIGNATURE Similarly, when multiple verifiers communicate to apply majority function and check authenticity of a result, the following data structure is used:
CONSENSUS VERIFICATION:
SWARM ID
NODE ID
APPLICATION ID
PUBLIC KEY
ATTESTATION PUBLIC KEY
RESULT
RESULT HASH
NODE SIGNATURE For device verification response, the following data structure is used:
SWARM ID
DEVICE ID
APPLICATION ID
PUBLIC KEY
ATTESTATION PUBLIC KEY
RESULT
RESULT HASH
DEVICE SIGNATURE In an embodiment, the collected data is further processed by the verifier nodes of the network to perform the attestation. In that case, each verifier node exchanges result of the attestation, with every other verifier node in the network. The verifier nodes can be configured to use appropriate communication channel(s) with suitable communication protocol(s), so as to establish communication with, and exchange the collected data with other verifier nodes. In various embodiments, each verifier node broadcasts the attestation results to other verifier nodes. As a result of the exchange of data, each node has own data as well as data from all other verifier nodes in the network, thus forming a consolidated result. Each verifier node is further configured to run a majority function on the consolidated result set, so as to generate final results that represent final attestation results of nodes being tested for authentication purpose. The final result thus obtained is then distributed among all nodes of the network.

In another embodiment, the collected data is further processed by the prover node that triggered the attestation. In that case, each verifier node shares result of the attestation, with the prover node. The prover node, by collecting the attestation result from every verifier node of the network, forms a consolidated result. The prover node then runs a majority function on the consolidated result set, so as to generate final attestation results of nodes being tested for authentication purpose. The majority function, as the name implies, works based on majority of values. That means, a value that is repeated maximum number of times is selected as the final attestation result. The majority function works based on trust basis; hence in a trust environment. For example, assume that the consolidated result has data from different verifiers in the form of TRUE and FALSE, along with proof. Number of TRUE and FALSE are counted. If number of TRUEs are greater than FALSEs then the consolidated result is TRUE. If number of FALSEs are greater than TRUEs then the consolidated result is FALSE. Accordingly the final attestation result is decided. The majority function is used for verifying individual verifier result, and in turn to identify malicious node(s) in the network. The majority function is further used while building a trust metric.

The final result thus obtained is then distributed among all nodes of the network, by the prover node.

In both scenarios, the final attestation result can be stored in an appropriate storage space for future reference purpose. In an embodiment, block chain based mechanism is used to store the data. Usage of block chain based storage system for this application provides the following advantages:
1. Resilient Logging: This feature may be leveraged by storing all the logs in the Blockchain as merkle trees. This helps to retrieve the records efficiently whenever there is a verification request. Given below are logging details in an example use-case scenario:
   NODE ATTESTATION TIME
   NODE ATTESTATION RESULT and PROOF
   NODE ATTESTATION VERIFICATION REQUEST TIME
   NODE ATTESTATION VERIFICATION RESULT (Merkle Hash+process result TRUE/FALSE) and PROOF
   VERIFIER NODE ID PARTICIPATED IN THE VERIFICATION PROCESS AND THEIR RESULT
   ROGUE NODE ID Further, Merkle Trees can be used to store information about proofs. An example is given below:
[PackageA]>[File1]
[PackageB]>[File1]
[PackageA]>Hash(File1)
[PackageB]>Hash(File1)
Root Hash>Hash (([PackageA]>Hash(File1))+([PackageB]>Hash(File1)))
2. Tamper-resistant records to support audit: This is the Blockchain property which is implemented by considering the previous block hash as one of the input to compute the current block hash making it tamper proof.

Build TRUST metric for every device which can be used for future purpose: This is the analytic feature which may be applied on any other database approach with engineering methods. One of the typical methodologies for building trust metric is given below:
Once the verification process is complete and results are broadcasted below steps are carried out by the prover node:
Perform the result logging.
Build TRUST METRIC against the VERIFIER nodes who participated in the verification process.

POSITIVE VOTE for honest verifier.
NEGATIVE VOTE for rogue verifier.
This metric evolves as the verification requests increase. This metric can be further used for selecting verifier nodes in future and also selecting the network path. Such a TRUST METRIC TABLE is maintained by every node in the swarm and this metric evolves over period of time.

Example of how TRUST METRIC is Used for Network Path Selection

Scenario 1: Disjoint Path:
Let node A be prover and Let node B be verifier. Now, consider that there are multiple paths between prover and verifier, as given below:
Path1: A>C>V>N>B
Path2: A>S>D>F>B
Path3: A>R>T>Y>B
In such a scenario possibilities are:
Prover A may receive correct response from all the paths and majority function results will be accepted [a happy path scenario].
Prover A may receive responses from Path 2 & 3 but no response from Path 1. Thus a negative vote may be considered. Further:
If paths 2 & 3 provide similar results then the nodes S, D, F, R, T, Y are given positive vote. If results from the paths 2 & 3 vary, then a result generated based on consensus of all the verifier nodes (which is generated based on the majority function) is considered as final result. Thus the paths that have given different results are given negative vote.
TABLE MATRIX:
NODE_ID: POSITIVE_VOTE: NEGATIVE_VOTE
Scenario 2: Shared Path:
Path 1: A>C>V>N>B
Path 2: A>S>D>F>B
Path 3: A>S>D>Y>B
In such a scenario possibilities are:
Prover A may receive the correct response from all the multiple paths and majority function results will be accepted [happy path scenario].
Prover A may receive responses from Path 2 & 3 but no response from Path 1. Thus a negative vote may be considered for C, V, N. Further, if Paths 2 & 3 result similar results then the nodes S, D, F, Y are given positive vote. If the paths vary in the results i.e. Path 2 is in line with consensus result, and Path 3 result varies, then Path 3 is investigated. While investigating Path 3, as compared to Path 2 only one node is different in Path 3 i.e. Y. As in Path 2 the nodes A, S, and D are found to be giving correct result, the remaining node, i.e. Y, is malicious.
TABLE MATRIX:
NODE_ID: POSITIVE_VOTE: NEGATIVE_VOTE
The variation in result from a path can also indicate presence of one or more malicious nodes in the network. Further, by analyzing the flow of data in the paths, the malicious node can be identified.
For example, assume that a verification request for a prover node in the network comes in. If the prover node is unavailable due to some reason, any other node of the network can respond to the request, as all nodes have the data.
In another embodiment, the network is a swarm of swarm of nodes, as in FIG. 4. As in the figure, in the place of a single node, a swarm of connected nodes is present. In that scenario, verification of swarm of swarm of devices is performed. As in FIG. 3, the groups are represented as G1, G2, . . . Gm. In an embodiment, for the purpose of verification, a minimum number of groups ($g_{min}$) may be required. Further, each group Gi may be required to have a minimum number of nodes ($n_{min}$) as members. The network may be further required to satisfy certain criteria, so as to be ready for the verification.

Figure 4:
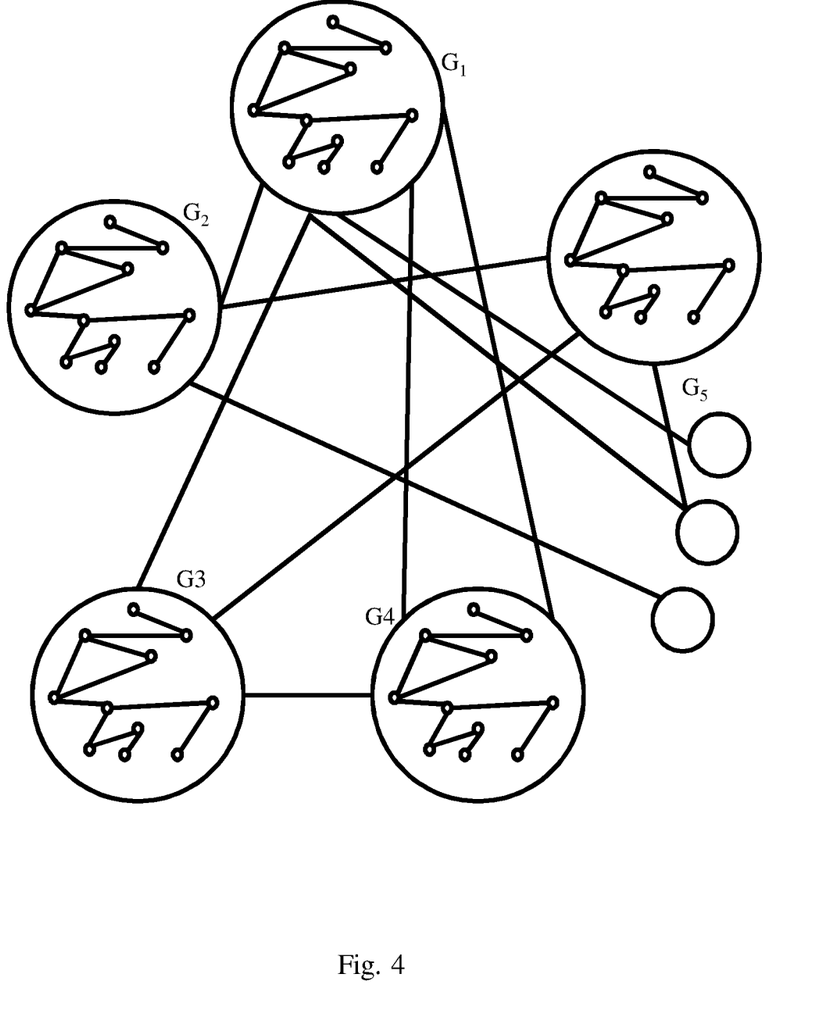
FIG. 4 is a block diagram representing multi-verifier mechanism in a network of swarm of swarm of connected nodes, according to some embodiments of the present disclosure.

Direct/indirect connection is applicable to such a network also. In such a network, each group Gi may have a direct or indirect connection with every other group Gi of the network. In such a topology, direct/indirect connectivity between any two groups may be defined in terms of link between at least one verifier node of respective groups. Further, in such a network, indirect connection between two groups (for example, Ga and Gv) is possible through different other groups, thus leading to having multiple paths between two verifier links that connect Ga and Gv.

Similar to the attestation process as described above, group attestation also requires certain number of groups to be selected as verifier groups. In an embodiment, minimum number of verifier groups required for a fully connected network is:

$$\text{Minimum number of verifier groups} = \left[\frac{m}{2} + 1\right]$$

where 'm' represents total number of swarms in the network

This can be changed as per implementation standards, as required.

Each group performs attestation of every other group in the network.
Group $G_1$ performs attestation for ($G_2$, $G_3$, $G_4$, and $G_5$)
Group $G_2$ performs attestation for ($G_1$, $G_3$, $G_4$, and $G_5$)
Group $G_3$ performs attestation for ($G_1$, $G_2$, $G_4$, and $G_5$)
Group $G_4$ performs attestation for ($G_1$, $G_2$, $G_3$, and $G_5$)
Group $G_5$ performs attestation for ($G_1$, $G_2$, $G_3$, and $G_4$)

Each group shares the data collected as part of the attestation process, with every other group. In an embodiment, sharing of the collected data can be done all at once, or in separate sessions. For instance, the verifier groups G2, G3, G4, and G5 have attestation results for G1. So, while sharing the attestation results, the groups may choose to share attestation results of G1, G2, G3, G4, and G5 separately at fixed or random intervals, or can send all available results at once. This can be configured, as per implementation requirements. As a result of the sharing/exchange of results, each group has the same set of consolidated results.

Each group is further configured to run a majority function over the consolidated result, and generate final attestation results (for example, v1, v2, v3, and v4). In an embodiment, for the given network, values of v1, v2, v3, and v4 are expected to be the same. The final results can be then distributed among/shared with all nodes/groups in the network, for further reference/verification purpose.

In another embodiment, the final results, along with any data unique to the nodes/groups being attested for verification, can be stored in a blockchain network, or any such storage means that satisfies requirements in terms of privacy, security, and such data storage norms.

One of the main conditions for this attestation process to work is at least a minimal connectivity between the nodes. In a network where there no ample connectivity between nodes of the network, attestation triggered by a verifier node fails to collect information from all nodes in the network (due to lack of connectivity between the nodes), thus leading to failure of the attestation process.

In an embodiment, the networks described herein can be configured to perform a check to detect presence of any malicious node(s) in the network. The networks may be further configured to determine, which node/group among the nodes/groups of the network is malicious, based on the final attestation results. By identifying the malicious nodes, communication between two nodes of the network can be routed such that the malicious node has no or minimum presence in the communication path selected, which in turn helps in fault tolerance.

In either scenario (swarm of nodes or swarm of swarm of nodes) the nodes of the network are configured generate own trust metric based on the final attestation results. Data in the trust metric can be used for selecting nodes that are suited for forming path for communication with another node of the network, by every node of the network. For example, if data in the trust metric of node indicates another node of the network as a malicious node, then that particular node can be omitted while deciding on a path to establish communication with another node of the network.

The multi-verifier approach can be used verify integrity of data generated by a node, during a self-attestation scenario. Assume that a node is performing self-attestation, and the corresponding data (i.e. hash code self-signed) is shared with multiple verifiers. The verifiers can communicate each other, and based on a majority function applied, can determine whether the data received from the node is same or not for all the verifiers. While the majority function is used, acceptance of the self-signed hash received from the prover node is based on consensus of the verifiers. Based on the result of the majority function (i.e. based on result of the consensus) integrity of the received data is verified, and corresponding data is stored in an associated database for future reference purpose.

Figure 2:
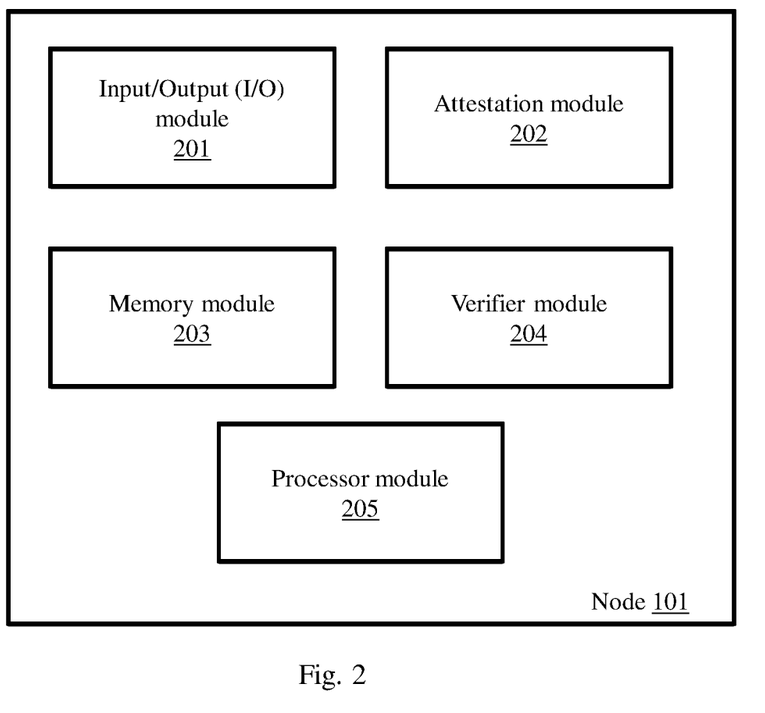
FIG. 2 is a block diagram depicting components of a node in the network, according to some embodiments of the present disclosure.

FIG. 2 is a block diagram depicting components of a node in the network, according to some embodiments of the present disclosure. The node 101 includes an Input/Output (I/O) module 201, an attestation module 202, a memory module 203, a verifier module 204, and a processor module 205. Description provided hereunder is to be read in conjunction with description of FIG. 1, as all the aforementioned functionalities of the node 101 are distributed among the listed components of the node 101.

The I/O module 201 is configured to provide at least one interface to support data communication with one or more external entities, via appropriate channels that comply with one or more appropriate communication protocols. The term 'external entity' can refer to a network component or a user. For example, the I/O module 201, by facilitating communication with multiple other nodes 101, helps create the network 100, and supports communication between nodes 101 of the network 100. For instance, when a verifier node of the network 100 initiates attestation process, the I/O module 201 of the verifier node transmits data pertaining to the attestation from the verifier node to other nodes of the network 100, and then collects responses from all connected nodes, which is provided as input to the attestation module 202. In another example, the external entity is a user who communicates directly with the node 101, via an interface provided, to provide control/data signals.

The attestation module 202 is configured to perform attestation of nodes of the network, whenever needed. In various embodiments, same node 101 may have to perform roles of a verifier node or of a non-verifier node, depending on different implementation standards/requirements, and based on role of the node 101, the corresponding attestation module 202 is configured to perform different functions. For instance, the attestation module 202 of a verifier node is configured to initiate attestation process and send commands to other verifier and non-verifier nodes to share certain specific information required for performing the attestation. At the same time, the attestation module 202 in a non-verifier node 101 can be configured to collect and send necessary data to verifier nodes, in response to the attestation initiated by any other verifier node 101 of the network. Upon receiving data from all other nodes of the network, the attestation module 202 of all verifier nodes 101 processes the collected data and performs attestation, and generate appropriate results. The attestation module 202 of a verifier node is further configured to distribute final attestation result, once generated, among other nodes of the network.

The memory module 203 is configured to facilitate storage of all data associated with the attestation and verification process. For example, the memory module 203 collects and stores data pertaining to attestation requests and response to each attestation request, for reference purpose. The memory module 203 can be configured to store such information temporarily or permanently, depending on requirements, and further allow nodes 101 and users to interact with and access data, wherein the data access may be regulated based on defined permissions. The memory module 203 is further configured to store information pertaining to malicious node(s) identified as part of verification process.

The verifier module 204 is configured to collect information received/collected in response to an attestation request, and perform verification of nodes. The verifier node 204 is configured to check for and identify malicious nodes in the network, based on data collected in response to the attestation process. The verifier node 204, as part of the verification, generates final results of attestation, and in turn verifies the nodes.

The processor module 205 is configured to communicate with other components of the node 101, and execute function(s) being handled by each component, using one or more hardware processors of suitable type.

Figure 5:
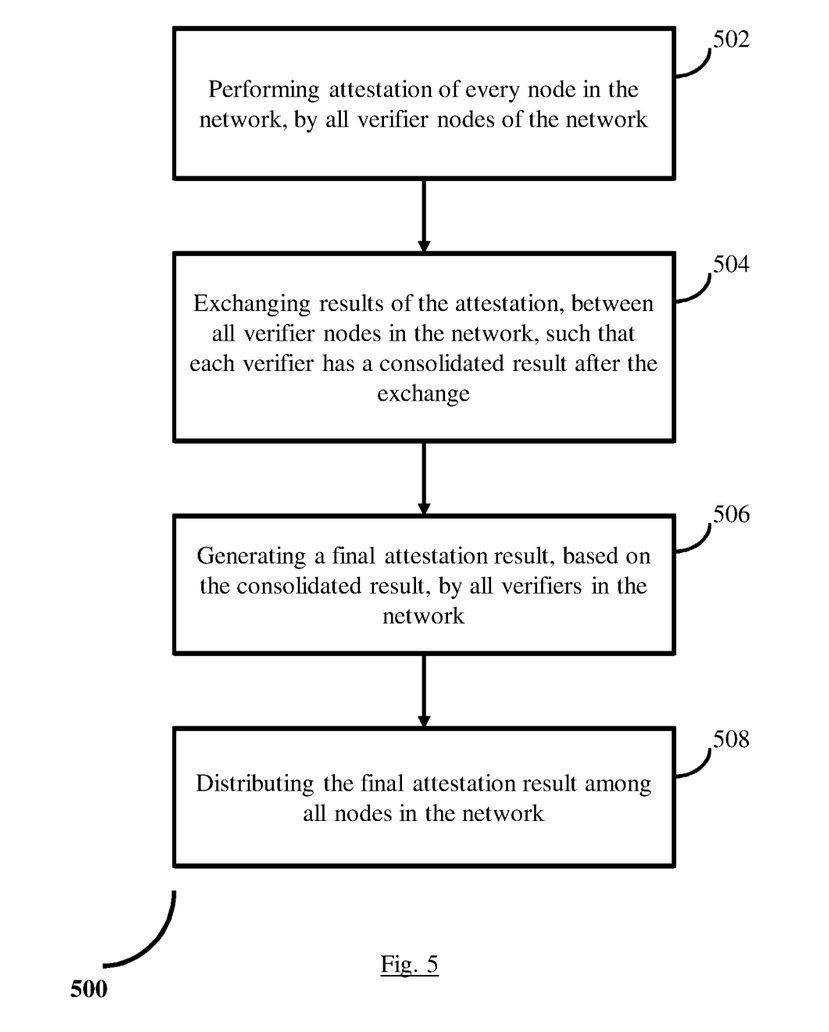
FIG. 5 is a flow diagram depicting steps involved in the process of performing device attestation, by verifier nodes, using the multi-verifier approach, according to some embodiments of the present disclosure.

FIG. 5 is a flow diagram depicting steps involved in the process of performing device attestation, using the multi-verifier approach, according to some embodiments of the present disclosure. In order to verify each/selected node of the network, certain nodes of the network are selected as verifier nodes. Here, 'node' may refer to individual nodes or group of nodes. Further, each verifier node performs (502) attestation of every other node in the network. Further, for the attestation process to work as expected, a certain minimum number of nodes from the nodes of the network are to be selected as the verifier nodes.

Further, each verifier node exchanges (504) results of the attestation, with every other verifier node in the network, such that each verifier node has same consolidated results, after the exchange. Further, each verifier node generates (506) final attestation results, separately, by treating the consolidated result with a majority function. The majority function, as the name implies, works based on majority of values. That means, a value that is repeated maximum number of times is selected as the final attestation result.

The final attestation results are then distributed (508) among all nodes of the network, for verification purpose. The final attestation result thus obtained can be used by the nodes of the network, for identifying malicious nodes in the network if any, and also for building a trust process to work as expected, a certain minimum number of nodes from the nodes of the network are to be selected as the verifier nodes.

Figure 6:
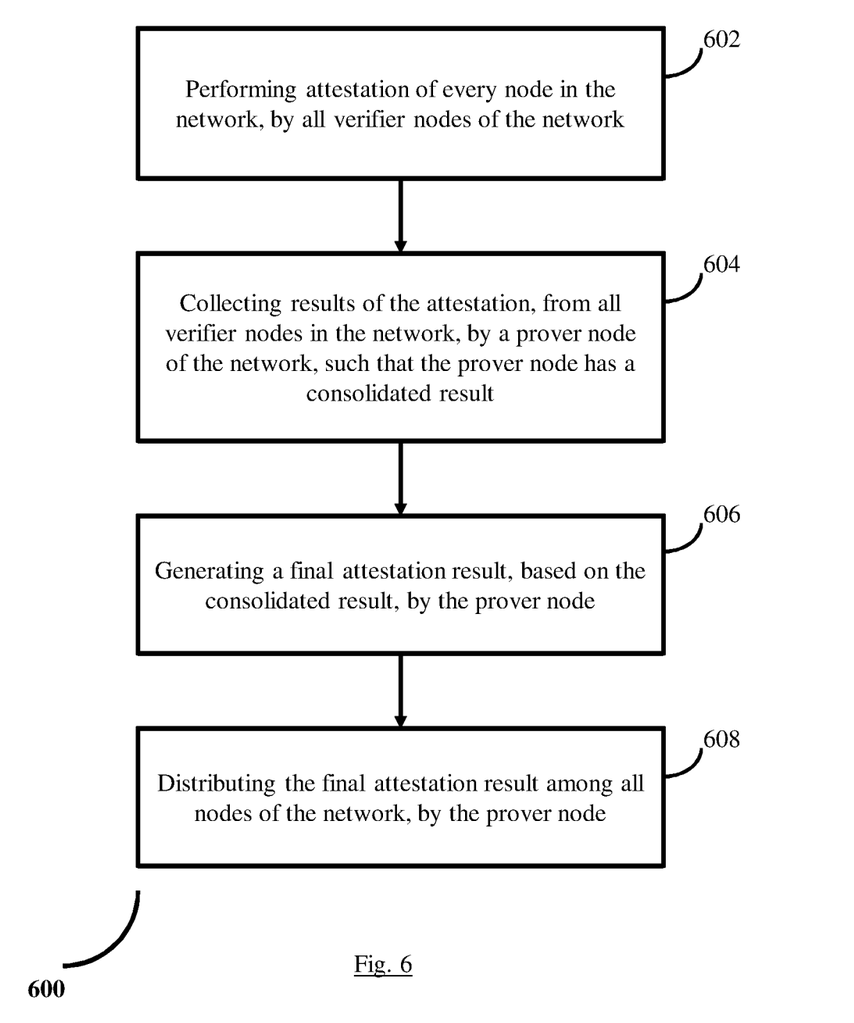
FIG. 6 is a flow diagram depicting steps involved in the process of performing device attestation, by a prover node, using the multi-verifier approach, according to some embodiments of the present disclosure.

Further, a prover node of the network 100 collects (604) results of attestation performed by all verifiers in the network 100, such that after collecting the results, the prover node has a consolidated set of results. Further, the prover node generates (606) final attestation, by treating the consolidated result with a majority function. The majority function, as the name implies, works based on majority of values. That means, a value that is repeated maximum number of times is selected as the final attestation result.

The prover node may distribute (608) the final attestation result among all nodes of the network, for verification purpose. The final attestation result thus obtained can be used by the nodes of the network, for identifying malicious nodes in the network if any, and also for building a trust metric. Various actions in FIG. 6 can be performed in the same order or in a different order. Further, or one or more of the actions in method 600 can be omitted.

Figure 7:
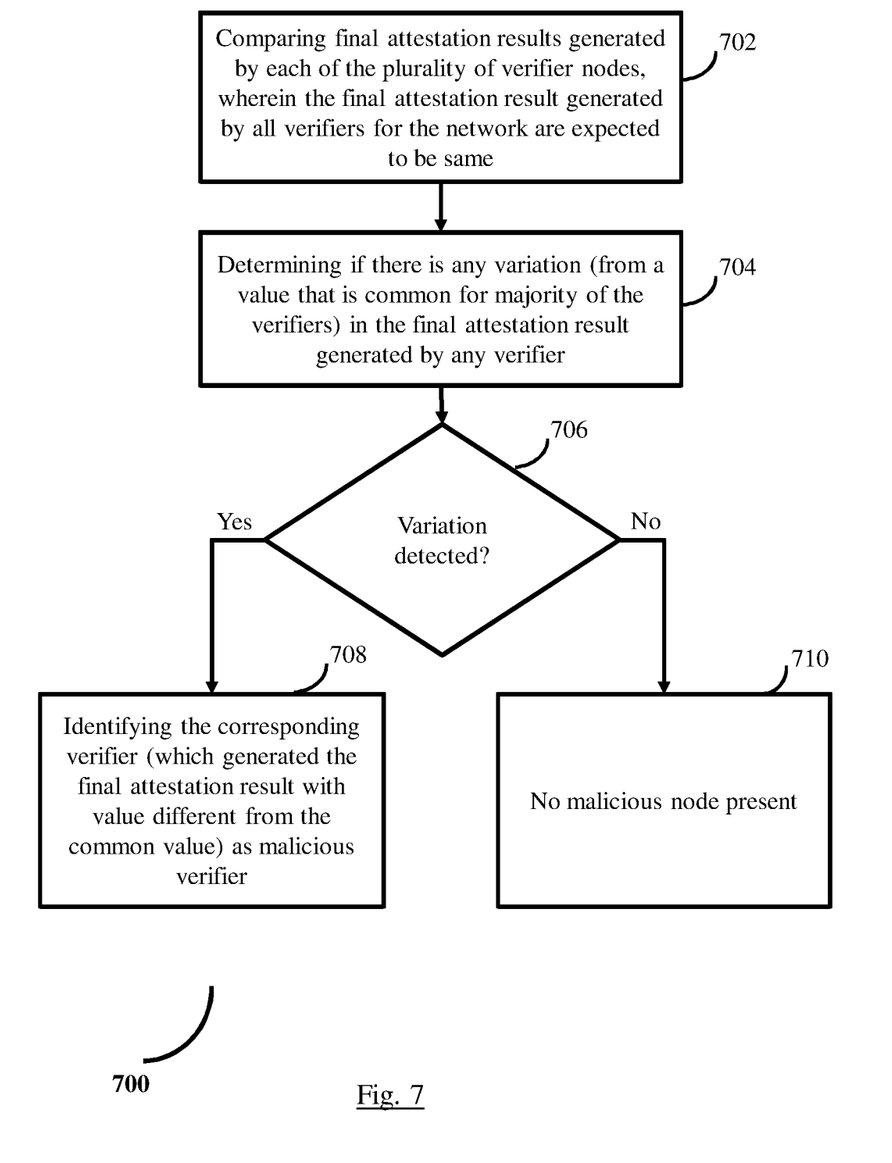
FIG. 7 is a flow diagram depicting steps involved in the process of checking for presence of malicious node in the network, and identifying the malicious node if present, during the device attestation process, using the multi-verifier approach, according to some embodiments of the present disclosure.

FIG. 7 is a flow diagram depicting steps involved in the process of checking for presence of malicious node in the network, and identifying the malicious node if present, during the device attestation process, using the multi-verifier approach, according to some embodiments of the present disclosure. In any network that includes multiple nodes, it is possible that one or more nodes are malicious. Presence of such malicious node(s) can adversely affect throughput of the network. In an embodiment, the malicious node may be one of the verifier nodes in the network. In such a scenario, in order to determine presence of the malicious node, and to identify the malicious node, the nodes in the network initially compares (702) the final attestation results generated by each node among themselves. In an embodiment, for a network that has no malicious node in it, the final attestation result generated by all verifier nodes are the same. In order to avoid threats such as man in the middle attack, the data transfer between nodes may be done in a secured communication channel, and using a digital signature.

By comparing the final attestation results of the nodes, each node (at least the verifier nodes) determines (704) if there is any variation in the final attestation result by any node, as compared to the values of final attestation results generated by other nodes. In an embodiment, a majority function is used to determine variation in the values, wherein value that has been repeated maximum number of times is selected as the final attestation result, and the values deviating from this value are identified as the 'variations'. If a variation is identified, then the corresponding verifier (that generated the varying result) is identified (708) as the malicious node. If no variation is found, then the network may conclude that no malicious node is present. In an embodiment, the malicious node is participating in the verification process so as to identify the malicious node in the network 100. All data associated with this process may be stored in a secured storage space (for example, block chain), and routing associated with data sharing between nodes may be carried out based on a trust metric that assures reliability of data. Various actions in FIG. 7 can be performed in the same order or in a different order. Further, or one or more of the actions in method 700 can be omitted.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
   identifying a plurality of nodes among a plurality of connected nodes in a network, as verifier nodes, via one or more hardware processors;
   collecting, individually by each of the plurality of verifier nodes, data required for performing attestation of every other node in the network, via the one or more hardware processors, wherein every other node comprises of verifier nodes and non-verifier nodes; and
   performing attestation of the nodes of the network, based on the data collected by all the verifier nodes, via the one or more hardware processors, wherein performing the attestation of the nodes of the network comprises of:
      exchanging the data collected by every verifier node, with every other verifier node, via the one or more hardware processors, wherein upon exchange of the data, each verifier node possesses same consolidated result as that of every other verifier node;
      generating a final attestation result based on the consolidated result with a majority function, via the one or more hardware processors, separately by each of the plurality of verifier nodes, wherein the majority function determines variation in a value of the final attestation result of each of the plurality of verifier nodes, wherein the value that is repeated maximum number of times is selected as the final attestation result; and
      distributing the final attestation result among the plurality of connected nodes, by each of the plurality of verifier nodes, via the one or more hardware processors, wherein the distributed final attestation result by each of the plurality of verifier nodes is used by the plurality of connected nodes for identifying any malicious node present in the network and to build a trust metric for every verifier node in the network, and wherein the trust metric is used for selecting verifier nodes and selecting a network path.

2. The method as claimed in claim 1, wherein performing the attestation of nodes of the network further comprises of:
gathering data collected by every verifier node, from the respective verifier nodes, via the one or more hardware processors, by a prover node of the network, wherein the prover node has a consolidated result after the gathering of data from the verifier nodes;
generating a final attestation result based on the consolidated result, via the one or more hardware processors, by the prover node; and
distributing the final attestation result among the plurality of connected nodes, via the one or more hardware processors, by the prover node.

3. The method as claimed in claim 1, wherein the attestation is performed for a swarm of connected nodes.

4. The method as claimed in claim 1, wherein the attestation is performed for a swarm of swarm of connected nodes.

5. The method as claimed in claim 1, wherein the identification of the malicious node comprises of:
comparing the final attestation results generated by each of the plurality of verifier nodes, wherein the final attestation result generated by the plurality of verifier nodes are same if there is no malicious node in the network;
identifying variation in the final attestation result generated by at least one of the plurality of verifier nodes, in comparison with the results generated by other verifier nodes in the network, as an indication of presence of the malicious node in the network; and
determining the at least one verifier node for which the variation is identified, as the malicious node.

6. The method as claimed in claim 1, wherein the plurality of verifier nodes are used for verifying self-attestation performed by a node, the method comprising:
performing self-attestation by a prover node of the network;
sending a signature generated as part of the self-attestation, to the plurality of verifier nodes, by the prover node;
applying the majority function on the signature, by the plurality of verifier nodes; and
verifying the self-attestation of the prover node, based on result of the majority function, by the plurality of verifier nodes.

7. A network, the network comprising:
a plurality of nodes connected to each other to form the network, wherein the connection between the plurality of nodes is direct or indirect, further wherein each of the plurality of nodes comprising:
a processor; and
a memory module comprising a plurality of instructions, the plurality of instructions configured to cause the processor to:
identify a plurality of nodes among a plurality of connected nodes in the network, as verifier nodes;
collect, individually by each of the plurality of verifier nodes, data required for performing attestation of every other node in the network, from respective nodes, wherein every other node comprises of verifier nodes and non-verifier nodes; and
perform attestation of nodes of the network, based on the data collected by all the verifier nodes, wherein performing the attestation of the nodes of the network comprises of:
exchanging the data collected by every verifier node with every other verifier node, wherein upon exchange of the data, each verifier node possesses same consolidated result as that of every other verifier node;
generating a final attestation result based on the consolidated result with a majority function, via the one or more hardware processors, separately by each of the plurality of verifier nodes, wherein the majority function determines variation in a value of the final attestation result of each of the plurality of verifier nodes, wherein the value that is repeated maximum number of times is selected as the final attestation result; and
distributing the final attestation result among the plurality of connected nodes, by each of the plurality of verifier nodes, via the one or more hardware processors, wherein the distributed final attestation result by each of the plurality of verifier nodes is used by the plurality of connected nodes for identifying any malicious node present in the network and to build a trust metric for every verifier node in the network, and wherein the trust metric is used for selecting verifier nodes and selecting a network path.

8. The network as claimed in claim 7 is further configured to perform the attestation of nodes by:
gathering data collected by every verifier node, from respective verifier nodes, by a prover node of the network, wherein the prover node has a consolidated result after the gathering of data from the verifier nodes;
generating a final attestation result based on the consolidated result, by the prover node; and
broadcasting the final attestation result among the plurality of connected nodes, by the prover node.

9. The network as claimed in claim 7 is configured to perform attestation for a swarm of connected nodes.

10. The network as claimed in claim 7 is configured to perform attestation for a swarm of swarm of connected nodes.

11. The network as claimed in claim 7 is configured to identify presence of any malicious node in the network, if present, based on a final attestation result generated by performing the attestation of the nodes, by:
comparing the final attestation results generated by each of the plurality of verifier nodes, by at least one the plurality of verifier nodes, wherein the final attestation result generated by each verifier node is expected to be same, for the network;
identifying variation in the final attestation result generated by at least one of the plurality of verifier nodes, based on the comparison, wherein such a variation, if present, is considered as an indication of presence of the malicious node in the network; and
determining the at least one verifier node for which the variation is identified, as the malicious node.

12. The network as claimed in claim 7, wherein the plurality of verifier nodes are configured to verify self-attestation performed by a node of the network, by:

collecting a signature generated as part of the self-attestation of a prover node of the network, from the prover node, by the plurality of verifier nodes;

applying the majority function on the signature, by the plurality of verifier nodes; and verifying the self-attestation of the prover node, based on result of the majority function, by the plurality of verifier nodes.

13. A non-transitory computer readable medium embodying a program executable in a computing device for contract management, comprising:

a program code for identifying a plurality of nodes among a plurality of connected nodes in a network, as verifier nodes, via one or more hardware processors of the computing device;

a program code for collecting, individually by each of the plurality of verifier nodes, data required for performing attestation of every other node in the network, wherein every other node comprises of verifier nodes and non-verifier nodes; and a program code for performing attestation of the nodes of the network, based on the data collected by all the verifier nodes, wherein performing the attestation of the nodes of the network comprises of:

exchanging the data collected by every verifier node, with every other verifier node, wherein upon exchange of the data, each verifier node possesses same consolidated result as that of every other verifier node;

generating a final attestation result based on the consolidated result with a majority function, via the one or more hardware processors, separately by each of the plurality of verifier nodes, wherein the majority function determines variation in a value of the final attestation result of each of the plurality of verifier nodes, wherein the value that is repeated maximum number of times is selected as the final attestation result; and distributing the final attestation result among the plurality of connected nodes, by each of the plurality of verifier nodes, via the one or more hardware processors, wherein the distributed final attestation result by each of the plurality of verifier nodes is used by the plurality of connected nodes for identifying any malicious node present in the network and to build a trust metric for every verifier node in the network, and wherein the trust metric is used for selecting verifier nodes and selecting a network path.

14. The non-transitory computer readable medium as claimed in claim 13, wherein performing the attestation of nodes of the network further comprises of:

gathering the data collected by every verifier node, from the respective verifier nodes, by a prover node of the network, wherein the prover node has a consolidated result after the gathering of data from the verifier nodes;

generating a final attestation result based on the consolidated result, by the prover node; and distributing the final attestation result among the plurality of connected nodes, by the prover node.

15. The non-transitory computer readable medium as claimed in claim 13, wherein the identification of the malicious node comprises of:

comparing the final attestation results generated by each of the plurality of verifier nodes, wherein the final attestation result generated by the plurality of verifier nodes are same if there is no malicious node in the network;

identifying variation in the final attestation result generated by at least one of the plurality of verifier nodes, in comparison with the results generated by other verifier nodes in the network, as an indication of presence of the malicious node in the network; and determining the at least one verifier node for which the variation is identified, as the malicious node.

16. The non-transitory computer readable medium as claimed in claim 13, wherein the plurality of verifier nodes are used for verifying self-attestation performed by a node, the method comprising:

performing self-attestation by a prover node of the network;

sending a signature generated as part of the self-attestation, to the plurality of verifier nodes, by the prover node;

applying the majority function on the signature, by the plurality of verifier nodes; and verifying the self-attestation of the prover node, based on result of the majority function, by the plurality of verifier nodes.

* * * * *